United States Patent
Murayama et al.

(10) Patent No.: US 7,333,191 B2
(45) Date of Patent: Feb. 19, 2008

(54) SCANNING PROBE MICROSCOPE AND MEASUREMENT METHOD USING THE SAME

(75) Inventors: Ken Murayama, Tsuchiura (JP); Yukio Kenbou, Tokyo (JP); Yuuichi Kunitomo, Tsuchiura (JP); Takenori Hiroki, Tsuchiura (JP); Yoshiyuki Nagano, Tsuchiura (JP); Takafumi Morimoto, Kashiwa (JP); Tooru Kurenuma, Tsuchiura (JP); Hiroaki Yanagimoto, Ibaraki (JP); Hiroshi Kuroda, Ibaraki (JP); Shigeru Miwa, Ibaraki (JP)

(73) Assignee: Hitachi Kenki Finetech Co., Ltd., Tokyo (JP)

( * ) Notice: Subject to any disclaimer, the term of this patent is extended or adjusted under 35 U.S.C. 154(b) by 94 days.

(21) Appl. No.: 10/893,364

(22) Filed: Jul. 19, 2004

(65) Prior Publication Data

US 2005/0012936 A1 Jan. 20, 2005

(30) Foreign Application Priority Data

Jul. 18, 2003 (JP) ............................. 2003-199097

(51) Int. Cl.
*G01B 1/00* (2006.01)
(52) U.S. Cl. ...................................... 356/150
(58) Field of Classification Search ................ 356/150
See application file for complete search history.

(56) References Cited

U.S. PATENT DOCUMENTS 5,294,804 A * 3/1994 Kajimura ............... 250/559.31
5,394,741 A * 3/1995 Kajimura et al. ............. 73/105
5,408,094 A * 4/1995 Kajimura ..................... 250/234
5,448,399 A * 9/1995 Park et al. ................... 359/372
5,656,809 A * 8/1997 Miyashita et al. .......... 250/225
5,859,364 A * 1/1999 Toda et al. ................... 73/105
5,877,891 A * 3/1999 Park et al. ................... 359/372
6,298,715 B1 * 10/2001 Thomson et al. ............. 73/105
6,590,703 B2 * 7/2003 Park et al. ................... 359/372
6,661,571 B1 * 12/2003 Shioda et al. ................ 359/372

FOREIGN PATENT DOCUMENTS

| JP | A-6-82248 | | 1/1993 |
| JP | A-226926 | | 2/1995 |
| JP | 409166607 A | * | 6/1997 |
| JP | A-2001-249067 | | 1/2001 |

* cited by examiner

*Primary Examiner*—Roy M. Punnoose
(74) *Attorney, Agent, or Firm*—Mattingly, Stanger, Malur & Brundidge PC

(57) ABSTRACT

A scanning probe microscope has a cantilever with a probe facing a sample and a measurement section for measuring a physical quantity occurring between the probe and the sample when the probe scans a surface of the sample, holding the physical quantity constant to measure the surface of the sample. The above microscope further has a probe tilt mechanism, an optical microscope etc. for detecting a position of the probe when the probe is tilted, and a control section for setting the probe in a first tilt posture and second tilt posture, measuring a surface of the sample by the measurement section at each tilt posture, detecting the position of the probe at least at the second tilt posture by the optical microscope etc., and making a measurement location at the second tilt posture match with a measurement location at the first tilt posture for measurement.

10 Claims, 7 Drawing Sheets

(A)

(B)

(C)

SCANNING PROBE MICROSCOPE AND MEASUREMENT METHOD USING THE SAME

BACKGROUND OF THE INVENTION

1. Field of the Invention

The present invention relates to a scanning probe microscope and a measurement method using the same, more particularly relates to a scanning probe microscope suitable for automatic measurement of side walls by measurement of fine relief shapes etc. on the surface of a sample like a wafer and a measurement method using the same.

2. Description of the Related Art

Scanning probe microscopes are known as measurement systems having measurement resolutions enabling observation of fine objects on the atomic level. In recent years, scanning probe microscopes have been applied to a variety of fields such as measurement of the fine relief shapes in the surfaces of wafers or substrates on which semiconductor devices are fabricated. There are various types of scanning probe microscopes for the different physical quantities for detection used for measurement. For example, there are scanning tunnel microscopes utilizing tunnel current, atomic force microscopes utilizing atomic force, magnetic microscopes utilizing magnetic force, etc. The ranges of their applications have been growing as well.

Atomic force microscopes are particularly suitable for detecting the fine relief shapes on sample surfaces and are proving their worth in the fields of semiconductor substrates, disks, etc. Recently, they have also been used in applications for in-line automatic inspection processes.

An atomic force microscope is basically configured provided with a measurement unit operating based on the principle of atomic force microscopes. The measurement unit is provided with a tripod-type or tube-type XYZ fine actuator formed utilizing piezoelectric devices. The bottom end of the XYZ fine actuator has a cantilever having a probe at its tip attached to it. The tip of the probe faces the surface of the sample. The cantilever is provided with, for example, an optical lever type photo detector. In the optical lever type photo detector, a laser beam emitted from a laser light source (laser oscillator) arranged above the cantilever is reflected at the back surface of the cantilever and detected by the photo detector. If the cantilever twists or bends, the position of incidence of the laser beam at the photo detector changes. Therefore, if the probe and cantilever displace, it is possible to detect the direction and amount of the displacement based on a detection signal output from the photo detector. An atomic force microscope is further provided with a comparator and controller as a control system. The comparator compares the detection voltage signal output from the photo detector and the reference voltage and outputs an error signal. The controller creates a control signal resulting in an error signal of zero and sends this control signal to the Z-fine actuator in the XYZ fine actuator. A feedback servo control system holding the distance between the sample and probe constant is formed in this way. It is possible to use this configuration to make the probe track and scan the fine reliefs on the sample surface and measure their shapes.

When the atomic force microscopes were first invented, the central issue was the use of their high resolution for measurement of fine shapes on the surface of dimensions on the nanometer (nm) order. At the present time, however, scanning probe microscopes have expanded in range of use to include in-line automatic inspection in the middle of in-line fabrication systems of semiconductor devices. In view of this, in actual inspection processes, it is required to measure the extremely sharp reliefs in the fine relief shapes on the surfaces of the semiconductor devices fabricated on wafers. At the present stage, automatic measurement of the surfaces of vertical walls or the side walls of holes having angles of 90 degrees, considered impossible in the past, is being sought for in-line inspection applications.

As technology for measuring vertical walls using atomic force microscopes, Japanese Patent Publication (A) No. 6-82248 and Japanese Patent Publication (A) No. 2001-249067 may be mentioned. Typical shapes of the cantilevers and probes disclosed in these publications are shown in FIG. 11. A probe 502 provided at the tip of a cantilever 501 is shaped similar to a cone at the area around the tip. That is, the probe 502 is formed by a straight part 502a and a cone-shaped tip 502b. FIG. 11 shows part of the area near the surface of the sample 503. The surface of the sample 503 is formed with grooves or holes having any depth, projections 504, etc. (hereinafter referred to as "grooves 504"). The probe 502 enters a groove 504 at the surface of the sample 503 and measures the shape of the groove 504. The probe 502 can be brought close to the surface parts of the side walls 504b and 504c of the groove 504 due to the shape of the cone-shaped tip 502b together with measurement of a bottom 504a of the groove 504. Therefore, by modifying the method of movement of the probe 502, it is possible to measure the side walls 504b and 504c of the groove 504.

As other technology for measurement of vertical side walls by the atomic force microscopes, there is the technology proposed by Japanese Patent Publication (A) No. 8-226926. An example of the state of measurement by the probe disclosed in this publication is shown in FIG. 12. The scanning probe microscope according to this publication is configured making a probe 512 at a tip of a cantilever 511 tilt (tilt method). FIG. 12 shows the state of tilt of the probe 512 and measurement of the surfaces of side walls 504b and 504c of the groove 504 formed at the surface of a sample 503. The probe 512 has a straight shape having a diameter of about 10 to 20 nm. Measurement is performed by making the probe 512 having this shape tilt by exactly a required angle ($\theta$). A scanning probe microscope enabling measurement by this tilt method can be realized by a comparatively simple measurement system and can utilize currently technology to accurately measure the left and right side edges of projections etc., that is, side walls. By applying technology such as seen in recent carbon nanotubes to fabrication of probes, it is possible to realize the probe 512 of a diameter of about 10 to 20 nm. The practical applications are growing as well.

In the case of the system of the related art shown in FIG. 11, as circuit patterns of semiconductor devices (LSIs) fabricated on substrates become finer and the width a of the groove 504 becomes smaller than 100 nm—reaching the level of 50 nm in the future, the shape of the probe 502 having the cone-shaped tip 502b will make measurement impossible and the increasing fineness will not be able to be handled. In the case of this system, it would be necessary to make the diameter b of the cone-shaped tip 502b smaller than the width a of the groove 504 of the circuit pattern. For example, if making the diameter b of the cone-shaped tip 502b 40 nm, the diameter of the straight part 502a would become smaller than 10 nm. This is impractical from the viewpoints of fabrication and mechanical strength as well.

As opposed to this, in the system of the related art shown in FIG. 12, since it is possible to fabricate the probe 512 of a fine diameter and straight shape, it is possible to deal with the increased fineness of circuit patterns of semiconductor devices. In the case of the probe 512, the probe is formed by just a straight part. There is none of the problem with the diameter possessed by the cone-shaped probe and therefore it is possible to measure the side walls of the groove 504 even if semiconductor devices become finer.

On the other hand, with measurement by the tilt method shown in FIG. 12, the probe 512 is used for measurement by a single tilt posture, so there is the problem that it is only possible to measure one of the two side walls of the groove 504. To measure the two side walls of the groove 504, it becomes necessary to invert the tilt angle of the probe 512 and perform the measurement again one more time. Measurement systems of the atomic force microscopes configured to make the probe 512 having a straight shape tilt to the two sides to approach the side walls of the groove 504 and measure the shapes of the side walls have not yet exhibited sufficient technical advances at the present for the automatic measurement required for in-line measurement of semiconductor production lines. The reason why automatic measurement cannot be handled is that when changing the direction of tilt of the probe for measurement, at the time of the tilt, the positional relationship between the probe and sample changes before and after the tilt, so it is extremely difficult to measure the same location of a sample automatically from the two sides. No matter how high the precision the tilt and rotation mechanism provided, design of a practical measurement system is difficult in the field of measurement of fine dimensions of 50 to 100 nm. As explained above, in the field of automatic measurement, no atomic force microscope or other microscope practically realizing the tilt method has been realized.

SUMMARY OF THE INVENTION

An object of the present invention is to provide a scanning probe microscope able to use the tilt method to measure side walls etc. and able to make automatic measurements, and a measurement method of the same.

The scanning probe microscope and measurement method according to the present invention are configured as follows to achieve the above object.

The scanning probe microscope is provided with a probe section (cantilever etc.) with a probe arranged so as to face a sample and a measurement section (portion comprised of optical lever type photo detector, feedback servo control system, scan device, XYZ fine actuator, data processor or other control device). The measurement section measures the surface of the sample by causing the probe scan the surface holding a predetermined physical quantity such as the atomic force etc. constant. The scanning probe microscope is further provided with a probe tilt mechanism, a probe position detecting section (optical microscope etc.), and a control section. The probe tilt mechanism makes the probe tilt by any angle. The probe position detector detects the position of the probe when the probe is tilted. When setting the probe at a first tilt posture and second tilt posture by the probe tilt mechanism and measuring a surface of the sample by the measurement section at each tilt posture, the control section detects the position of the probe at least at the second tilt posture by the probe position detecting section and makes a measurement location at the second tilt posture match with a measurement location at the first tilt posture.

In the scanning probe microscope, preferably, the probe section is a cantilever having the probe at its tip.

In the scanning probe microscope, preferably, the probe tilt mechanism makes the probe tilt by making the cantilever rotate about an axis of a longitudinal direction of the cantilever and by making a point of the tip of the probe rotate about a center point.

In the scanning probe microscope, preferably, the probe position detecting section is comprised of an optical microscope for observing a measurement region of the sample, an imaging device for capturing an optical image obtained by this optical microscope, and an image processing section for processing an observed image obtained by this imaging device.

In the scanning probe microscope, preferably, the settings of the plurality of tilt angles and measurements of the sample surface by the probe at each tilt angle are stored in a storing section as automatic measurement conditions so as to be included in a measurement routine to be executed by the control section.

In the scanning probe microscope, preferably, the control section automatically measures a side wall part of the same location at the surface of the sample by the probe at the first tilt posture and the second tilt posture.

The measurement method in a scanning probe microscope provides a method of control of an automatic measurement operation of a scanning probe microscope provided with the above-mentioned probe section and measurement section, holding a physical quantity constant at the measurement section, and scanning the surface of the sample by the probe to measure the surface of the sample. This measurement method comprises setting the probe at least at a first tilt posture and second tilt posture and measuring the surface of the sample by the measurement section at each tilt posture. At this time, it detects the position of the probe at least at the second tilt posture and makes a measurement location at the second tilt posture match with the measurement location at the first tilt posture for measurement.

In the measurement method in a scanning probe microscope, preferably, the probe section is a cantilever having the probe at its tip.

In the measurement method in a scanning probe microscope, preferably, the method further comprises making the probe tilt by making the cantilever rotate about an axis of a longitudinal direction of the cantilever and by making a point of the tip of the probe rotate about a center point.

In the measurement method in a scanning probe microscope, preferably, the method further comprises automatically measuring a side wall part of the same location at the surface of the sample by the probe at the first tilt posture and the second tilt posture.

When using a scanning probe microscope to measure and inspect substrates or other samples on which semiconductor devices are fabricated in an in-line automatic inspection process and measuring side walls by making the cantilever and probe tilt at the relief shapes on the sample surface in the algorithm for automatic measurement, in the related art, the positional relationship between the probe and sample changed before and after the tilt. As opposed to this, according to the configuration of the scanning probe microscope according to the present invention and its measurement method, it becomes possible to detect positional changes and position the probe to eliminate positional offset and to measure the same location by the probe at the first tilt posture and at the second tilt posture. In the conventional hardware configuration, even with adjustment by a precision adjustment device, it was difficult to the positions of the probe with different tilts match with a positional precision of 100 nm or less. In the configuration according to the present invention, it is possible to find the positions of at least two tilt angles among the positions of the probe at different tilt angles by image processing of an observed image obtained by an optical microscope and possible to measure the same location of a sample at two tilt based on these values. In particular, when setting the probe in a measurement region present on a silicon wafer, joint use is made of narrowing down the measurement location utilizing an optical microscope and narrowing down a fine part based on the measurement section of the scanning probe microscope after that. It is possible to automatically measure the same location of a sample surface, for example, a side wall, by the probe at two tilt postures based on the probe position information at the two tilt angles.

According to the present invention, the scanning probe microscope and measurement method for automatically measuring a sample surface, including measurement of the side walls etc. of relief, based on the tilt method of measurement while tilting the probe are configured to utilize an optical microscope etc. and image processing to accurately detect the position of the probe at the time of making the probe tilt and adjust the position of the probe, so automatic measurement is possible even if including a process of measurement of the side walls etc. based on probe tilt. Further, automatic measurement of the same location of a sample surface is possible by the probe at different tilt postures.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
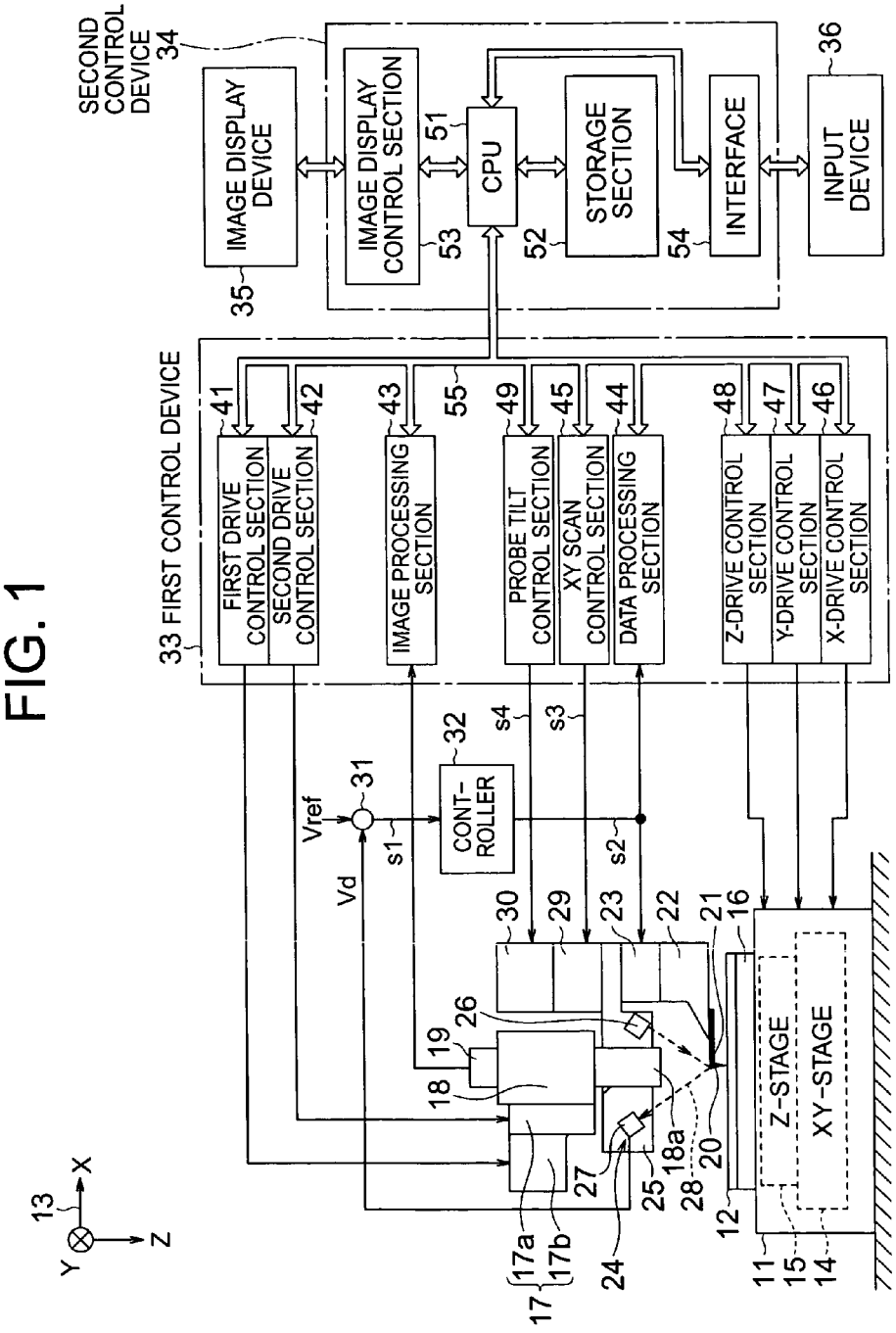
FIG. 1 is a view of the overall configuration of a scanning probe microscope according to the present invention.

Preferred embodiments of the present invention will be described in detail below while referring to the attached figures The overall configuration of a scanning probe microscope (SPM) according to the present invention will be explained with reference to FIG. 1. The scanning probe microscope is an atomic force microscope (AFM) as a typical example.

The lower part of the scanning probe microscope is provided with a sample stage 11. The sample stage 11 has a sample 12 placed on it. The sample stage 11 is a mechanism for changing the position of a sample 12 in a three-dimensional coordinate system 13 comprised of perpendicular X-, Y-, and Z-axes. The sample stage 11 is comprised of an XY stage 14, Z-stage 15 and sample holder 16. The sample stage 11 usually is comprised as a coarse or rough actuator causing displacement (positional change) at the sample side. The top surface of the sample holder 16 of the sample stage 121 has a sample 12 with a relatively large area and thin shape placed and held on it. The sample 12 is, for example, a substrate or wafer on the surface of which integrated circuit patterns of semiconductor devices are fabricated. The sample 12 is secured on the sample holder 16. The sample holder 16 is provided with a sample securing chuck mechanism.

Figure 2:
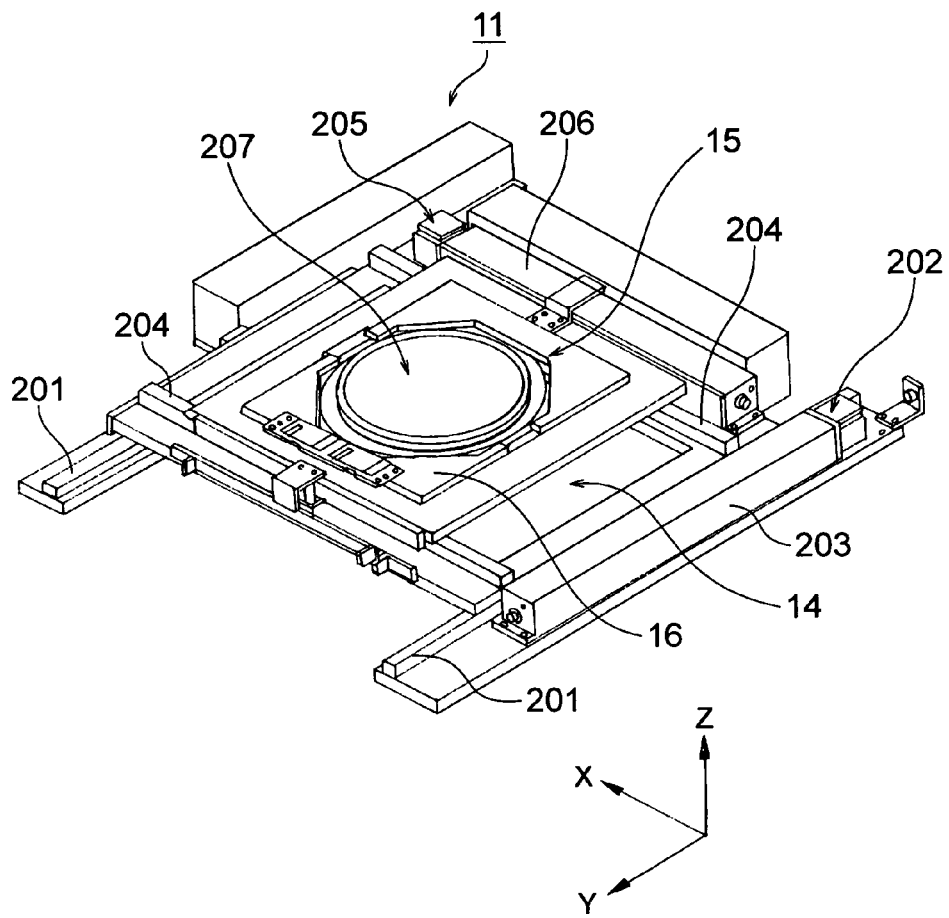
FIG. 2 is a perspective view of the specific configuration of a sample stage.

A specific example of the configuration of the sample stage 11 will be explained with reference to FIG. 2. In FIG. 2, a reference numeral 14 designates an XY stage and 15 designates a Z-stage. The XY stage 14 is a mechanism for making a sample move on a horizontal plane (XY plane), while the Z-stage 15 is a mechanism for making the sample 12 move in the vertical direction. The Z-stage 15 is, for example, attached by being mounted on the XY stage 14.

The XY stage 14 is comprised of a Y-axis mechanism made of two parallel Y-axis rails 201 arranged toward the Y-axis direction, a Y-axis motor 202, and a Y-axis drive force transmission mechanism 203 and an X-axis mechanism made of two parallel X-axis rails 204 arranged toward the X-axis direction, an X-axis motor 205, and an X-axis drive force transmission mechanism 206. Due to the XY stage 14, the Z-stage 15 is made to move freely in the X-axis direction or Y-axis direction. Further, the Z-stage 15 is additionally provided with a drive mechanism for raising and lowering the sample holder 16 along the Z-axis direction. In FIG. 2, the drive mechanism is hidden and is not shown. The sample holder 16 is provided on it with a chuck mechanism 207 for securing the sample 12. The chuck mechanism 207 used is normally a mechanism utilizing a mechanical, suction, electrostatic, or other action.

In FIG. 1, an optical microscope 18 provided with a drive mechanism 17 is arranged at a position above the sample 12. The optical microscope 18 is supported by a drive mechanism 17. The drive mechanism 17 is comprised of a focus-use Z-direction actuator 17a for moving the optical microscope 18 in the Z-axis direction and an XY direction actuator 17b for moving it in the XY axis directions. For mounting, the Z-direction actuator 17a moves the optical microscope 18 in the Z-axis direction, while the XY direction actuator 17b moves the unit of the optical microscope 18 and the Z-direction actuator 17a in the XY axis directions. The XY direction actuator 17b is secured to a frame member, but in FIG. 1, illustration of the frame member is omitted. The optical microscope 18 is arranged with its object lens 18a facing the bottom and is arranged at a position approaching the surface of the sample 12 from directly above. The top end of the optical microscope 18 is additionally provided with a TV camera (imaging unit) 19. The TV camera 19 picks up an image of a specific region of the sample surface captured by the object lens 18a and outputs the image data.

A cantilever 21 provided with a probe 20 at its tip is arranged in a state approaching the top side of the sample 12. The cantilever 21 is secured to a mount 22. The mount 22 is, for example, provided with an air suction section (not shown). The air suction part is connected to an air suction device (not shown). The cantilever 21 is secured and attached by its large area base being attached by suction at the air suction part of the mount 22.

The mount 22 is attached to the Z-fine actuator 23 for causing fine movement operation in the Z-direction. Further, the Z-fine actuator 23 is attached to the bottom surface of a cantilever displacement detector 24.

The cantilever displacement detector 24 is comprised of a support frame 25 to which a laser light source 26 and photo detector 27 are attached in a predetermined relative arrangement. The cantilever displacement detector 24 and the cantilever 21 are held in a constant positional relationship. A laser beam 28 emitted from the laser light source 26 is reflected at the back surface of the cantilever 21 and enters the photo detector 27. The cantilever displacement detector forms an optical lever-type photo detector. If the cantilever 21 twists, bends, or is otherwise deformed, this optical lever type photo detector can detect the displacement due to the deformation.

The cantilever displacement detector 24 is attached to an XY fine actuator 29. The XY fine actuator 29 makes the cantilever 21 and probe 20 etc. move in the directions of the X-axis and Y-axis by fine distances. At this time, the cantilever displacement detector 24 is simultaneously moved. The positional relationship between the cantilever 21 and the cantilever displacement detector 24 does not change.

In the above, the Z-fine actuator 23 and the XY fine actuator 29 usually are comprised of piezoelectric devices. The Z-fine actuator 23 and the XY fine actuator 29 cause the probe 20 to displace by fine distances (for example, several to 10 μm and maximum 100 μm) in the X-axis direction, Y-axis direction and Z-axis direction.

The above XY fine actuator 28 is further attached to a probe tilt mechanism 30. The probe tilt mechanism 30 has the function of making the lower part tilt overall from the XY fine actuator 29, whereby in the end it becomes possible to make the axial direction of the probe 20 tilt with respect to the vertical direction to the surface of the sample 12. The tilt posture of the probe 20 can be created by causing rotation about the axis of the longitudinal direction of the cantilever 21 and further can be created by causing rotation about an axis perpendicular to the longitudinal direction. The tilt posture or tilt angle of the probe 20 can be freely created. The probe tilt mechanism 30 can be configured employing a piezoelectric device, motor, or any other actuator.

The probe tilt mechanism 30 is attached to the above-mentioned not shown frame member to which the unit relating to the optical microscope 18 is attached.

In the above mounting, the observation field of the optical microscope 18 includes the surface of a specific region of the sample 12 and the tip (back surface) of the cantilever 21 including the probe 20.

Next, a control system of the scanning probe microscope will be explained. The control system is comprised of a comparator 31, a controller 32, a first control device 33, and a second control device 34. The controller 32 is used for realizing in principle a measurement mechanism using an atomic force microscope (AFM). Further, the first control device 33 is for controlling the drive of a plurality of drive mechanisms, while the second control device 34 is positioned as a superior control device.

The comparator 31 compares a voltage signal Vd output from the photo detector 27 and a reference voltage (Vref) set in advance and outputs a deviation signal s1. The controller 32 produces a control signal s2 resulting in the deviation signal s1 of zero and sends this control signal s2 to the Z-fine actuator 23. The Z-fine actuator 23 receiving the control signal s2 adjusts the height position of the cantilever 21 to hold the distance between the probe 20 and the surface of the sample 12 constant. The control loop from the photo detector 27 to the Z-fine actuator 23 is a feedback servo control loop for detecting the state of deformation of the cantilever 21 by the optical lever-type photo detector and holding the distance between the probe 20 and the sample 12 at a predetermined constant distance determined based on the reference voltage (Vref). Due to this control loop, the probe 20 is held at a constant distance from the surface of the sample 12. If scanning the surface of the sample 12 in this state, it is possible to measure relief or uneven shapes of the sample surface.

Next, the first control device 33 is a control device for driving the parts of the scanning probe microscope and is provided with the following functional sections.

The optical microscope 18 can be changed in position by the drive mechanism 17 comprised of the focus-use Z-direction actuator 17a and XY direction actuator 17b. The first control device 33 is provided with a first drive control section 41 and second drive control section 42 for controlling the operations of the Z-direction actuator 17a and XY direction actuator 17b.

The image of the sample surface and cantilever 21 obtained by the optical microscope 18 is picked up by the TV camera 19 and fetched as image data. The image data obtained by the TV camera 19 of the optical microscope 18 is input to the first control device 33 and processed by an internal image processing section 43.

In the feedback servo control loop including the controller 32 etc., the control signal s2 output from the controller 32 means the height signal of the probe 20 at the scanning probe microscope (atomic force microscope). The height signal of the probe 20, that is, the control signal s2, can give information relating to the change of the height position of the probe 20. The control signal s2 including the height position information of the probe 20 is given for controlling the drive of the Z-fine actuator 23 as explained above and is fetched into a data processing section 44 of the control device 33.

The probe 20 is made to scan the sample surface at the measurement region at the surface of the sample 12 by driving the XY fine actuator 29. The drive of the XY fine actuator 29 is controlled by an XY scan control section 45 providing the XY fine actuator 29 with an XY scan signal s3.

Further, the XY stage 14 and the Z-stage 15 of the sample stage 11 are controlled in drive by an X-drive control section 46 outputting an X-direction drive signal, a Y-drive control section 47 outputting the Y-direction drive signal, and a Z-drive control section 48 outputting a Z-direction drive signal.

Further, the operation of the probe tilt mechanism 30 for making the probe 20 tilt in posture in accordance with need is controlled by a probe tilt control section 49 providing the probe tilt mechanism 30 with a tilt instruction signal s4.

Note that the first control device 33 is provided with a storage section (not shown) storing and holding setting control data, input optical microscope image data, data relating to the height position of the probe, etc. in accordance with need.

The second control device 34 is positioned as the superior one for the first control device 33. The second control device 34 performs processing such as storing and executing a usual measurement program, setting and storing usual measurement conditions, storing and executing an automatic measurement program, setting and storing its measurement conditions, storing the measurement data, performing image processing on the measurement results, and displaying the image at a display device (monitor) 35. In particular, in case of the present invention, the second control device is provided with a program including a measurement process for making the probe tilt with respect to a side wall of a projection or recess of the sample surface and measuring the side wall in automatic measurement and automatically changing the tilt posture of the probe to measure a side wall of the same location. In setting the measurement conditions, basic items such as the measurement range and measurement speed, the tilt angle, the measurement conditions at the time of measurement at the tilt posture, and other conditions for automatic measurement are set. These conditions are stored and managed in a setting file. Further, it is also possible to configure the microscope to have a communication function for communicating with external devices.

The second control device 34 must have the above functions, so is comprised of a processing device constituted by a CPU 51 and a storage section 52. The storage section 52 stores the above programs and condition data etc. Further, the second control device 34 is provided with an image display control section 53, communicating section, etc. In addition, the second control device 34 has an input device 36 connected to it through an interface 54. The input device 36 can be used to set and change the measurement program, measurement conditions, data, etc. stored in the storage section 52.

The CPU 51 of the second control device 34 provides superior or higher control instructions etc. to the functional parts of the first control device 33 through a bus 55 and is provided with image data or data relating to the height position of the probe from the image processing section 43, data processing section 44, etc.

Next, the basic operation of the above scanning probe microscope (atomic force microscope) will be explained.

The tip of the probe 20 of the cantilever 21 is made to approach a predetermined region of the surface of the semiconductor substrate or other sample 12 placed on the sample stage 11. Normally, the probe approach mechanism constituted by the Z-stage 15 is used to bring the probe 20 close to the surface of the sample 12 and atomic force is made to act to cause the cantilever 21 to bend. The bending amount due to the bending deformation of the cantilever 21 is detected by the above-mentioned optical lever-type photo detector. In this state, the probe 20 is made to move with respect to the sample surface so as to scan the sample surface (XY scan). The XY scan of the surface of the sample 12 by the probe 20 is performed by making the probe 20 move by the XY fine actuator 29 (fine movement) or by making the sample 12 side move by the XY stage 14 (coarse movement) so as to create relative movement in the XY plane between the sample 12 and the probe 20.

The probe 20 side is moved by giving an XY scan signal s3 relating to XY fine movement to the XY fine actuator 29 provided with the cantilever 21. The scan signal s3 relating to the XY fine movement is given from the XY scan control section 45 in the first control device 33. On the other hand, the sample side is moved by giving drive signals from the X-drive control section 46 and the Y-drive control section 47 to the XY stage 14 of the sample stage 11.

The XY fine actuator 29 is comprised of a piezoelectric device and enables high precision and high resolution scan movement. Further, the measurement range measured by the XY scan by the XY fine actuator 29 is limited by the stroke of the piezoelectric device, so becomes a range determined by a distance of about 100 μm even at the maximum. According to the XY scan by the XY fine actuator 29, measurement in a fine, narrow range becomes possible. On the other hand, the XY stage 14 is comprised of an electromagnetic motor as a drive, so the stroke can be enlarged up to several hundred mm. According to the XY scan by the XY stage, measurement in a broad range becomes possible.

In this way, a predetermined measurement region on the surface of the sample 12 is scanned by the probe 20 and the amount of bending (amount of deformation by bending etc.) of the cantilever 21 is controlled to become constant by the feedback servo control loop. The amount of bending of the cantilever 21 is constantly controlled to match a reference target amount of bending (set by the reference voltage Vref). As a result, the distance between the probe 20 and the surface of the sample 12 is held at a constant distance. Therefore, the probe 20, for example, moves (scans) following the fine relief shapes (profile) of the surface of the sample 12. By obtaining the height signal of the probe, the fine relief shapes of the surface of the sample 12 can be measured.

Figure 3:
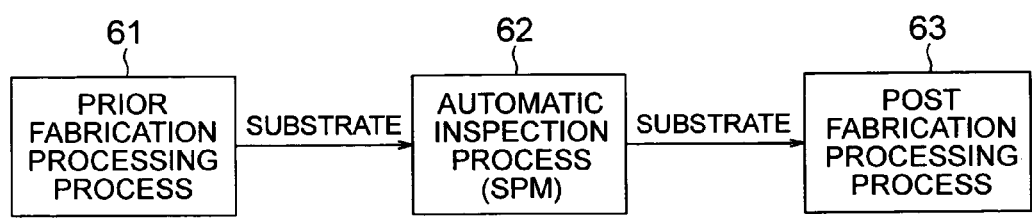
FIG. 3 is a block diagram of the configuration where a scanning probe microscope according to the present invention is used in an in-line automatic inspection process.

As explained above, the scanning probe microscope is, for example, as shown in FIG. 3, built into an automatic inspection process 62 for inspecting a substrate (wafer) at an intermediate stage of an in-line fabrication system of semiconductor devices (LSIs), for example. A not shown substrate transport system is used to unload a substrate to be inspected (sample 12) from the previous fabrication process 61 and place it on the substrate holder 16 of the scanning probe microscope (SPM) of the automatic inspection process 62, whereupon the scanning probe microscope automatically measures the fine relief or uneven shapes in a predetermined region of the substrate surface, it is judged if the processing in the fabrication of the substrate in the previous stage has passed or failed, then the substrate transport system again unloads the substrate to the later fabrication process 63.

Next, an automatic measurement method using a scanning probe microscope will be explained with reference to FIG. 4 to FIG. 10. This automatic measurement method includes a measurement process of making the probe 20 tilt by two different angles with respect to the side wall of the same location for example at a projection or recess of a specific region to be inspected at the surface of the sample 12 and measuring using the tilt postures.

Figure 4:
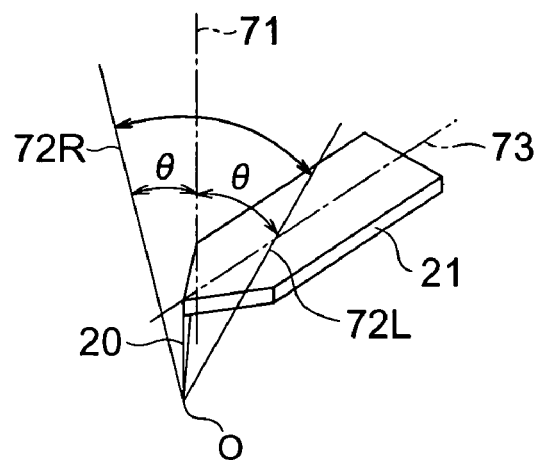
FIG. 4 is a perspective view of a part including a cantilever and a probe.

FIG. 4 shows the cantilever 21 expanded by a perspective view and shows an example of the tilted state of the cantilever 21. The cantilever 21 of the posture shown by the solid line shows the normal state with no tilt (preferably the horizontal state). At this time, the probe 20 provided at the bottom surface of the tip of the cantilever 21 faces downward at its tip. The line 71 shown by the broken line shows the axial line of the probe 20. The axial line 71 of this state is set so as to become substantially vertical to the sample surface.

Further, in FIG. 4, the axial line 71 is shown with two lines 72R and 72L at its left and right. The lines 72R and 72L are the tilt postures of the axial line 71 obtained by making the cantilever 21 rotate clockwise and counterclockwise by angles of θ about the axial line 73 in its longitudinal direction toward the tip. Therefore, the lines 72R and 72L show the tilt postures (axial lines) of the tilted probe 20. The two lines 72R and 72L have an angle of 2θ between them. The probe tilt mechanism 30 for tilting the axial line 71 of the probe 20 as with the line 72R or line 72L can be configured in any way. The tilt posture of the probe 20 by the probe tilt mechanism 30 is preferably created by a rotational motion about the point O of the tip of the probe 20. The point O of the tip of the probe 20 is ideally set as a point not changing in position (non-moving point).

Figure 5:
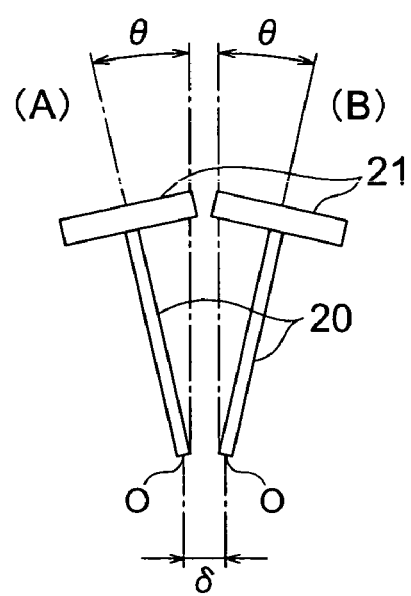
FIG. 5 is a view seen from the tip side of the cantilever.

FIG. 5 is a front view of the cantilever 21 as seen from the tip side, that is, the probe 20 side. According to FIG. 5, if making the cantilever 21 rotate to change from the first tilt posture (A) to the opposite side second tilt posture (B), the point O of the tip of the probe 20 actually moves by exactly the distance δ. Therefore, when making the cantilever 21 rotate to change the tilt posture of the probe 20 about the point O of the tip, the point O of the tip preferably does not move, but in actuality positional error due to the rotation mechanism included in the probe tilt mechanism 30 and changes in parameters such as the length of the probe (in the case of different types of probes) result in at least the error δ arising. Therefore, the automatic measurement program of the present invention controls the position so that no error δ arises when changing the tilt of the probe 20 from the first tilt posture (A) to the second tilt posture (B).

Figure 6:
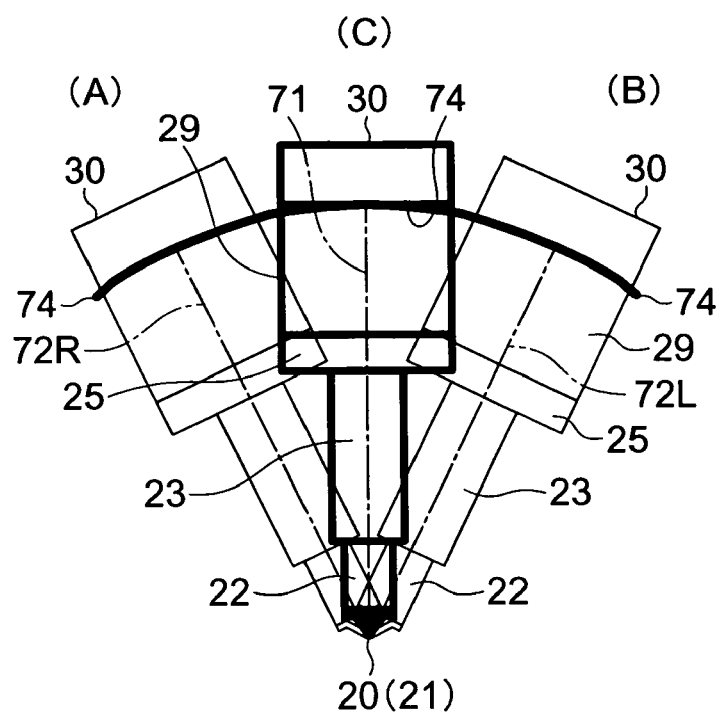
FIG. 6 is a view of a probe tilt mechanism and the structure of the part below it seen from the tip side of the cantilever.

FIG. 6 is a view of a unit comprised of the probe 20, cantilever 21, mount 22, Z-fine actuator 23, support frame 25, XY fine actuator 29, and probe tilt mechanism 30 as seen from the tip side of the cantilever 21. FIG. 6 shows three states, that is, a state (C) of the normal posture not tilted with respect to the cantilever 21, a state (A) of the first tilt posture, and a state (B) of the second tilt posture.

The probe tilt mechanism 30 generally drives the tilt action by an electromagnetic motor etc. Instead of an electromagnetic motor, an air pressure or other actuator is also possible. The probe tilt mechanism 30, in the example of this embodiment, performs a tilt operation clockwise in the longitudinal direction 73 of the cantilever 21 toward the tip so as to make the probe 20 tilt to the right side by exactly the angle θ (corresponding to the state (A)) and similarly performs a tilt operation counterclockwise in the longitudinal direction 73 toward the tip so as to make the probe 20 tilt to the left side by exactly the angle θ (corresponding to the state (B)).

Note that FIG. 5, FIG. 6, etc. are drawn seen from the tip side of the cantilever 21, so the left and right tilt directions are shown opposite. That is, the right side tilt, that is, the first tilted state (A), is drawn at the left side, while the left side tilt, that is, the second tilted state (B), is drawn at the right side.

Further, FIG. 6 shows the position of the point O of the tip of the probe 20 as not moving, but in actuality, as explained in FIG. 5, movement of a distance δ occurs. The movement of the distance usually occurs in the XY plane.

The tilt angle of the probe 20 by the probe tilt mechanism 30, as shown in FIG. 6, is performed with a guide surface 74 set at the probe tilt mechanism 30 and with the guide surface 74 rotating about the point O of the tip of the probe 20.

In the tilt operation of the probe 20, the probe tilt mechanism 30 was configured to enable tilt left and right by θ each, but the invention is not limited to this. The tilt angle may be any angle in accordance with the shape of the sample surface. Further, the left and right tilt angles may also be different. The tilt operation of the probe tilt mechanism 30 is performed in accordance with need during automatic measurement based on a probe tilt program provided at the storage section 52 in the second control device 34.

Figure 7:
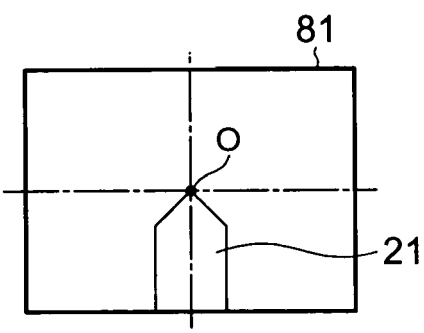
FIG. 7 is a view of the observed image showing an example of a typical observation field obtained by an optical microscope.
Figure 8:
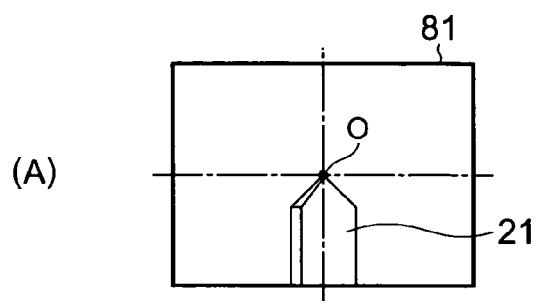
FIGS. 8A to 8C are transition diagrams of an observed image showing a routine when measuring the same location of a sample surface by tilt postures of two tilt angles.
Figure 8:
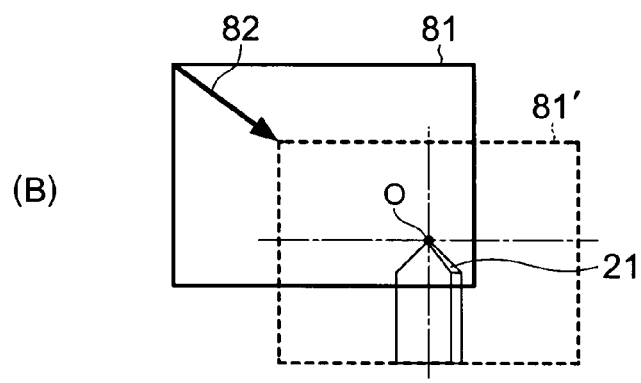
Figure 8:
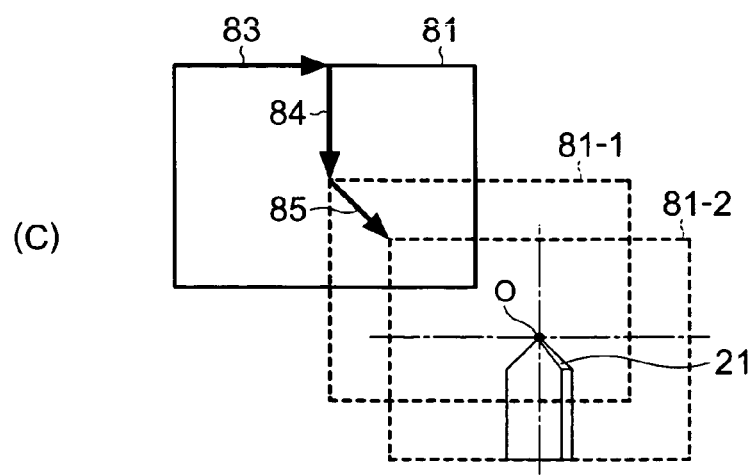
Figure 9:
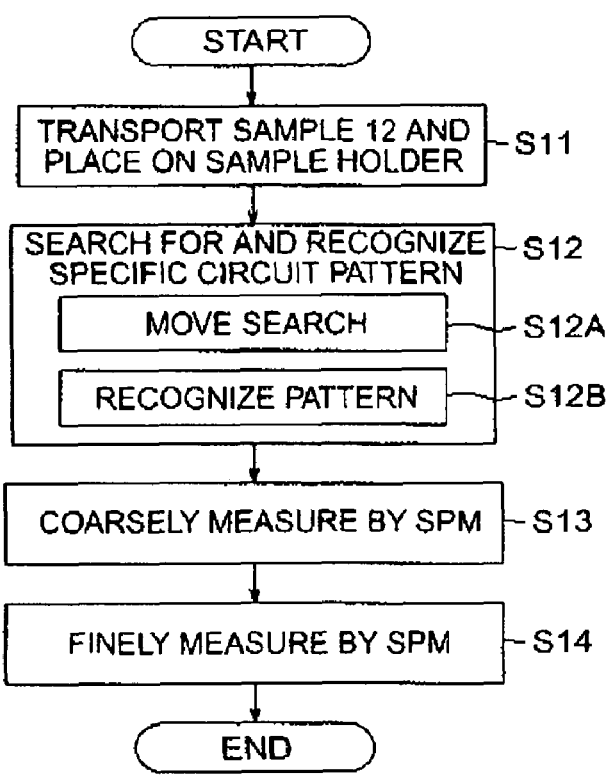
FIG. 9 is a flow chart of a basic measurement process by a scanning probe microscope.
Figure 10:
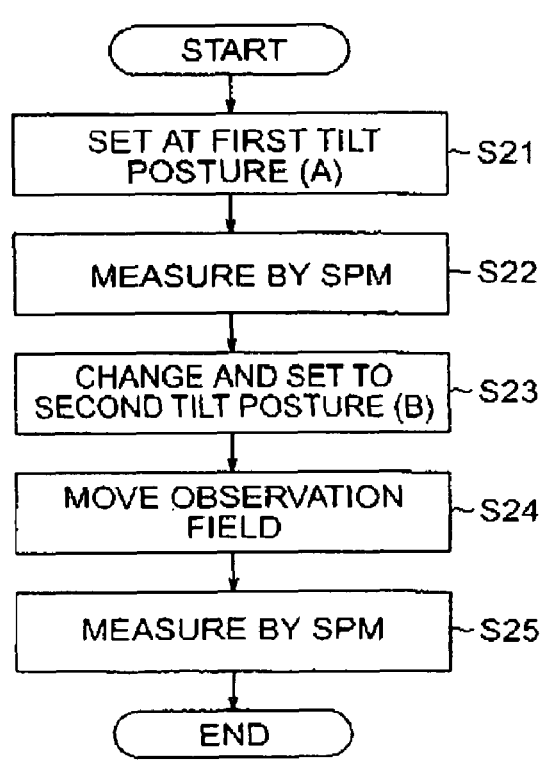
FIG. 10 is a flow chart of a process for measuring the same side wall of a sample surface by changing the tilt posture.
Figure 11:
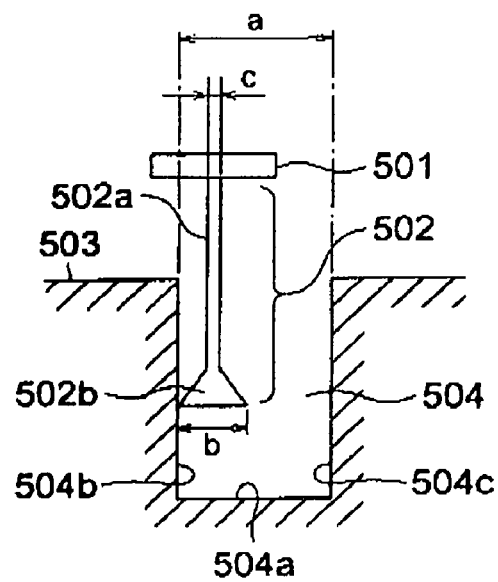
FIG. 11 is an explanatory view of key parts showing a first example of a scanning probe microscope of the related art for measuring side walls.
Figure 12:
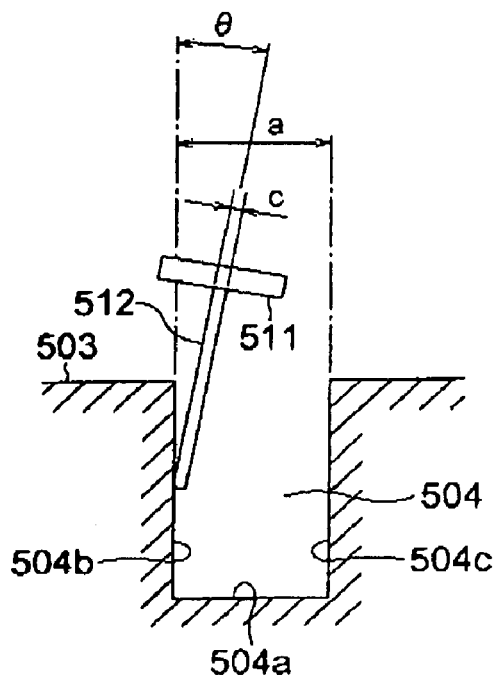
FIG. 12 is an explanatory view of key parts showing a second example of a scanning probe microscope of the related art for measuring side walls.

Referring to FIG. 7 to FIG. 10, automatic measurement by a scanning probe microscope having the above configuration will be explained. FIG. 7 shows a typical example of an observed image obtained by the optical microscope 18. Reference numeral 81 is an observation field of the optical microscope 18. This observation field 81 can show a specific region of the sample surface and the back surface of the tip of the cantilever 21 at the part where the probe 20 is provided. In actuality, by focusing the optical microscope 18, one becomes blurred. In FIG. 7, the back surface of the cantilever 21 is focused on. FIG. 8 shows an observed image by the optical microscope 18 showing automatic positioning when automatically measuring while successively making the probe 20 tilt from the two sides of the same location of the sample surface. FIG. 9 is a flow chart of a routine for usual automatic measurement by a scanning probe microscope at an in-line automatic inspection process 62. FIG. 10 is a flow chart of a routine for automatic measurement in the case of inclusion of a process of probe tilt.

In the automatic measurement of the sample 12, usually the sample 12 (for example, 8 to 12 inch substrate) is automatically transported by a substrate transport mechanism to place it on the sample holder 16 of the sample stage 11 (step S11), then the probe 20 is set at the measurement location of the specific region of the sample 12 (step S12). The measurement location of the specific region of the sample 12 is formed with circuit patterns unique to the sample 12 being inspected.

In FIG. 7, the cantilever 21 is not rotated and the probe is not tilted. In the observation field 81 shown in FIG. 7, the point O is assumed to be the location of the point of the tip of the probe 20. In the observation field 81 of the optical microscope 18, the center position is made to become the point O of the tip of the probe 20 of the cantilever 21 by setting the positional relationship of the optical microscope 18 with respect to the cantilever 21. When using the optical microscope 18 to observe the surface of the sample 12 and the cantilever 21 positioned below, if the focus-use Z-direction actuator 17a is used to focus on the back surface of the cantilever 21, the center point will become the tip point O of the probe 20. When focusing the optical microscope 18 at the sample surface, the image of the sample surface becomes clear and the image of the cantilever 21 becomes blurred. In this case as well, the positional relationship between the optical microscope 18 and the cantilever 21 is held at a predetermined constant relationship and the position of the point O of the tip of the probe 20 is held at the center position of the observation field 81.

When searching for a specific circuit pattern on the surface of the sample 12, usually the XY stage 14 of the sample stage 11 is made to operate. At this time, the optical microscope 18 is focused on the surface of the sample 12. The XY direction actuator 17b of the optical microscope 18 and the XY fine actuator 29 of the cantilever 21 are not driven. The optical microscope 18 and the cantilever 21 are held in a predetermined positional relationship.

At the above step S12, a specific circuit pattern of the surface of the sample 12 is searched for and confirmed by the optical microscope 18. In the search and recognition of a specific circuit pattern of the sample surface, movement for the search is automatically performed by the XY stage 14 of the sample stage 11 (step S12A) and the circuit pattern is recognized automatically by for example pattern recognition processing (step S12B).

After setting the probe 20 at the measurement location of the specific region of the sample 12 by step S12, for positioning at the fine part being measured, the measurement section of the scanning probe microscope (component for executing SPM measurement comprised of optical lever-type photo detector, feedback servo control loop, etc.) is utilized to measure the measurement location roughly in a field of 1 to 10 μm (step S13).

Further, finer measurement is performed based on the above measurement information (step S14). Due to the finer measurement by step S14, the part to be measured is measured by a dimension of 50 to several hundred nm. This measurement ends the inspection of the sample 12.

The above automatic measurement is ordinary measurement. The probe 20 measures one side of a side wall in the state tilted to one side for example. When making the probe 20 tilt to one side for the automatic measurement, the position of the probe 20 is corrected by calculation in accordance with the tilt angle.

Next, the process of probe tilt will be explained with reference to FIGS. 8A to 8C and FIG. 10. FIG. 8A shows the observed image when the probe 20 is at the first tilt posture (A), FIG. 8B shows the observed image when the state of the probe 20 is changed from the first tilt posture (A) to the second tilt posture (B) and the cantilever 21 is in the observation field, and FIG. 8C shows the observed image when the state of the probe 20 is changed from the first tilt posture (A) to the second tilt posture (B) and the cantilever 21 ends up out of the observation field.

In FIG. 8A, in the observation field 81, the cantilever 21 is rotated clockwise about the axis of the longitudinal direction and the probe 20 takes the first tilt posture (A). The probe 20 is set at the state of the first tilt posture (A) based on the rotation and tilt operation by the probe tilt mechanism 30 (step S21). At this time, the point O of the tip of the probe 20 is set so as to be positioned at the center point of the observation field 81. The probe 20 at the first tilt posture (A) is used for measurement of a specific location of the surface of the sample 12 by the measurement section of the scanning probe microscope (SPM measurement) (step S22).

Next, the probe tilt mechanism 30 is driven to make the probe 20 at the first tilt posture (A) tilt to the opposite side so as to take the second tilt posture (B) (step S23). The image of the observation field 81 obtained by the optical microscope as a result is shown in FIG. 8B. As shown in the figure, when the tilt of the probe 20 is changed from the first tilt posture (A) to the second tilt posture (B), as explained in FIG. 5, the tip of the probe moves by exactly the distance δ, so the point O of the tip of the probe 20 moves from the center point of the observation field 81. With a rotational mechanism of the probe tilt mechanism 30, such offset, including variations in positioning, are general.

Therefore, at the next step S24, the optical microscope 18 is made to move by the XY direction actuator 17b and the center point of the observation field 81 and the point O of the tip of the probe 20 are made to match by making the observation field 81 move by the optical microscope 18. In FIG. 8B, the arrow 82 showing the movement from the observation field 81 to the observation field 81' shows the state of movement of the observation field by the processing of step S24. By this, the point O of the tip of the probe 20 matches the center point of the observation field of the optical microscope 18. The optical microscope 18 is moved corresponding to the arrow 82 by recognizing the pattern of the image of the cantilever 21 in the observation field 81, calculating the positional relationship, and controlling the operation of the XY direction fine actuator 17b. Note that the observation field may also be moved according to the arrow 82 by making not the optical microscope side, but the cantilever side move. Further, it is possible to store the amount of movement of the observation field and use it for correction of the XY coordinate value at the time of measurement in accordance with need.

In the state with the point O of the tip of the probe 20 and the center point matched by the observation field 81', the probe 20 at the second tilt posture (B) is again used to measure a specific location of the back surface of the sample 12 by the measurement section of the scanning probe microscope (SPM measurement). At step S25 for measurement, the recognition of the sample pattern by the optical microscope 18, the narrowing down of the measurement location by the scanning probe microscope, and the measurement of the same location measured first are performed by an automatic algorithm.

A measurement method including the above probe tilt process can eliminate the positional offset of the tip of the probe at the time of change of the tilt, set the probe 20 in the state of the first tilt posture (A) and second tilt posture (B), and measure the same measurement location of a specific region of the surface of the sample 12 by SPM.

Further, when changing the tilt angle of the probe 20 from the first tilt posture to the second tilt posture, sometimes the position of the cantilever 21 becomes offset from the observation field of the optical microscope 18. This state is the state of FIG. 8C. This state easily occurs when using a separate rotational mechanism of the probe tilt mechanism 30. In such a case, normally the general movement position of the cantilever 21 can be mechanically estimated. Therefore, estimation processing is performed to make the optical microscope 18 move. The path of movement of the observation field shown by the arrows 83 and 84 of FIG. 8C shows the movement due to the estimation processing. The observation field 81-1 obtained as a result can capture the image of the cantilever 21. At the next stage, using the same routine as the routine explained at FIG. 8B, the observation field 81-1 can be made to move to the observation field 81-2 and center point of the observation field of the optical microscope 18 is made to match with the point O of the tip of the probe 21. After this, as explained in the example of FIG. 8B, the probe 20 of the second tilt posture (B) is used for SPM measurement of the same location of the sample surface.

In the above, when rotating the cantilever 21 to create a tilt posture of the probe 20 by the probe tilt mechanism 30, the cantilever 21 can be caught by the optical microscope 18 by a tracking operation by the XY direction actuator 17b and Z-direction actuator 17a.

The processing of automatically measuring the same location (side wall etc.) of a sample surface by tilt postures of two opposite angles of the probe 20 explained with reference to FIGS. 8A to 8C and FIG. 10, that is, a first tilt posture (A) and second tilt posture (B), is executed by a probe tilt measurement program (measurement condition file or recipe file) stored in a storage section 52 of a second control device 34. Regarding the measurement information based on the two angles for a measurement location at the surface of the sample 12, when for example measuring a vertical side wall, it is possible to obtain side wall information from the two sides, so it is possible to combine two measurement data based on the usually well known analysis processing.

Note that the two tilt angles of the probe 20 are shown as "θ", but basically generally are 0 to 45 degrees and 0 to −45 degrees. The two tilt angles are mostly the same amounts but plus and minus, but can be freely set in accordance with the shape of the sample 12. As the timings of measurement by the two angles, various timings may be considered. When automatically measuring a plurality of points on the surface of the sample, there is the method of measuring a single location by the two angles, then measuring sample points by the combination of the same, the method of measuring various points of the sample by the same tilt angle of the probe, then changing the tilt angle and measuring the points again, etc. Further, it is also possible to change the tilt angle of the probe in the middle of measurement of a specific line.

In the above embodiments, the observation by the optical microscope was wide field, large scale observation. The measurement by a scanning probe microscope is narrow field observation. These observations are combined for realization of the measurement algorithm.

In the explanation of the above embodiments, an optical microscope was used for wide field observation, but instead it is also possible to use a scanning electron microscope, laser microscope, or other various types of microscopes.

The configurations, shapes, sizes, and relative arrangements explained in the above embodiments are only generally shown to an extent enabling the present invention to be understood and worked. Further, the numerical values and compositions (materials) of the configurations are only illustrations. Therefore, the present invention is not limited to the embodiments explained above and can be modified in various ways so long as not departing from the scope of the technical idea shown in the claims.

The present disclosure relates to subject matter contained in Japanese Patent Application No. 2003-199097, filed on Jul. 18, 2003, the disclosure of which is expressly incorporated herein by reference in its entirety.

What is claimed is:

1. A scanning probe microscope having a probe section with a probe arranged to face a sample, and a measurement section for measuring a surface of said sample using a physical quantity occurring between said probe and said sample when said probe scans the surface of said sample by holding said physical quantity constant, comprising:
   a probe tilt mechanism for making said probe tilt,
   a probe position detecting means for detecting a position of said probe when said probe is tilted, which includes an optical microscope, wherein an image of said probe is shown in an observation field of said optical microscope when detecting the position of the tilted probe, and
   a control means for controlling said probe tilt mechanism to make said probe tilt to set said probe at a first tilt posture and second tilt posture, controlling said measurement section to measure the surface of said sample at each tilt posture, making said probe position detecting means detect the position of said probe at least at said second tilt posture, and making a measurement location of said probe at said second tilt posture match with a measurement location of said probe at said first tilt posture, so that no error (δ) between the measurement locations of said probe at said first tilt posture and said second tilt posture arises when changing the tilt of said probe from said first tilt posture to said second tilt posture.

2. A scanning probe microscope as set forth in claim 1, wherein said probe section is a cantilever having said probe at its tip.

3. A scanning probe microscope as set forth in claim 2, wherein said probe tilt mechanism makes said probe tilt by making said cantilever rotate about an axis of a longitudinal direction of said cantilever and by making a point of the tip of said probe rotate about a center point.

4. A scanning probe microscope as set forth in claim 1, wherein said optical microscope includes an imaging device for capturing the image of said probe, and an image processing means for processing the image of said probe.

5. A scanning probe microscope as set forth in claim 1, wherein a plurality of tilt angles and measurements of the sample surface by said probe at each tilt angle are stored in a storing means as automatic measurement conditions so as to be included in a measurement routine to be executed by said control means.

6. A scanning probe microscope as set forth in claim 1, wherein said control means automatically measures a side wall part of the same location at the surface of said sample by said probe at said first tilt posture and said second tilt posture.

7. A measurement method in an automatic measurement operation of a scanning probe microscope having a probe section with a probe arranged to face a sample and a measurement section for measuring a surface of said sample using a physical quantity occurring between said probe and said sample when said probe scans a surface of said sample holding said physical quantity constant, comprising:
   a step of setting said probe at a first tilt posture and second tilt posture to measure a surface of said sample by said measurement section at each tilt posture,
   a step of detecting the position of said probe at least at said second tilt posture using an optical microscope, by showing an image of said probe in an observation field of said optical microscope when detecting the position of the tilted probe, and
   a step of making a measurement location at said second tilt posture match with a measurement location at said first tilt posture for measurement so that no error (δ) between the measurement locations of said probe at said first tilt posture and said second tilt posture arises when changing the tilt of said probe from said first tilt posture to said second tilt posture.

8. A measurement method of a scanning probe microscope as set forth in claim 7, wherein said probe section is a cantilever having said probe at its tip.

9. A measurement method of a scanning probe microscope as set forth in claim 8, comprising a step of making said probe tilt by making said cantilever rotate about an axis of a longitudinal direction of said cantilever, and by making a point of the tip of said probe rotate about a center point.

10. A measurement method using a scanning probe microscope as set forth in claim 7, further comprising a step of automatically measuring a side wall part of the same location at the surface of said sample by said probe at said first tilt posture and said second tilt posture.

* * * * *